(12) United States Patent
Caruana

(10) Patent No.: US 10,146,965 B2
(45) Date of Patent: Dec. 4, 2018

(54) METHOD AND SYSTEM FOR OPTIMIZED READING OF A RADIO FREQUENCY COMMUNICATION TRANSPONDER WITH THE AID OF A PASSIVE RESONANT CIRCUIT

(71) Applicant: GEMALTO SA, Meudon (FR)

(72) Inventor: Jean-Paul Caruana, Marseilles (FR)

(73) Assignee: GEMALTO SA, Meudon (FR)

( * ) Notice: Subject to any disclaimer, the term of this patent is extended or adjusted under 35 U.S.C. 154(b) by 119 days.

(21) Appl. No.: 15/281,641

(22) Filed: Sep. 30, 2016

(65) Prior Publication Data

US 2017/0017811 A1    Jan. 19, 2017

Related U.S. Application Data

(63) Continuation of application No. 12/440,849, filed as application No. PCT/EP2006/066252 on Sep. 11, 2006.

(51) Int. Cl.
*G06K 19/00* (2006.01)
*G06K 7/00* (2006.01)
(Continued)

(52) U.S. Cl.
CPC ....... *G06K 7/0008* (2013.01); *G06K 7/10178* (2013.01); *G06K 19/025* (2013.01); *G06K 19/07749* (2013.01); *G06K 19/07796* (2013.01)

(58) Field of Classification Search
CPC .......................... H01Q 1/2216; H01Q 1/2225
(Continued)

(56) References Cited

U.S. PATENT DOCUMENTS 6,172,608 B1 *  1/2001  Cole .................... G06K 7/0008
                                                 340/10.4
6,567,050 B1 *  5/2003  Briggs .................... H01Q 1/22
                                                 343/741
(Continued)

FOREIGN PATENT DOCUMENTS

FR       2 777 141 A1       10/1999
FR       2 812 482          2/2002
(Continued)

OTHER PUBLICATIONS

Finkenzeller, Klaus, "RFID Handbuch", Sep. 26, 2002, München Wien, XP002439097, ISBN: 3-446-22036-4, pp. 83-85.
(Continued)

*Primary Examiner* — Ping Hsieh
(74) *Attorney, Agent, or Firm* — Buchanan Ingersoll & Rooney PC

(57) ABSTRACT

The invention relates to a method of reading RF transponders disposed in one and the same magnetic interrogation field, in which a magnetic coupling of the transponders is ensured with a passive resonant circuit during reading. The method is distinguished in that the passive antenna of the resonant circuit is associated with at least one transponder antenna, and the passive resonant circuit is tuned in such a way that the resonant frequency resulting from the association corresponds to one of the frequencies of the emission side bands of the transponder to be read. The invention also relates to the system corresponding to the method, a transponder structure and an object containing the transponder, in particular a travel document.

16 Claims, 4 Drawing Sheets

(51) Int. Cl.
*G06K 7/10* (2006.01)
*G06K 19/02* (2006.01)
*G06K 19/077* (2006.01)

(58) Field of Classification Search
USPC ...... 455/41.1, 41.2, 575.1; 340/572.1, 572.7, 340/445, 447, 448, 10.1, 10.2, 1.1; 343/895
See application file for complete search history.

(56) References Cited

U.S. PATENT DOCUMENTS

| | | | |
|---|---|---|---|
| 6,774,865 B1 | 8/2004 | Serra | |
| 7,058,357 B1 | 6/2006 | Wuidart et al. | |
| 7,432,874 B2 | 10/2008 | Meissner | |
| 7,586,410 B2 | 9/2009 | Tsirline et al. | |
| 7,782,209 B2* | 8/2010 | Lowe | G06K 7/0008 340/10.34 |
| 7,907,899 B1* | 3/2011 | Oliver | G06K 19/0723 327/343 |
| 2005/0035924 A1* | 2/2005 | Liu | G06K 19/07749 343/895 |
| 2005/0230966 A1 | 10/2005 | Trantoul et al. | |
| 2006/0164249 A1 | 7/2006 | Lutz et al. | |
| 2007/0229278 A1* | 10/2007 | Nagata | G06K 19/0723 340/572.7 |
| 2007/0290846 A1* | 12/2007 | Schilling | G01B 7/003 340/572.1 |
| 2008/0117027 A1* | 5/2008 | Tsirline | H01Q 1/2208 340/10.6 |
| 2009/0098825 A1 | 4/2009 | Huomo et al. | |

FOREIGN PATENT DOCUMENTS

| | | |
|---|---|---|
| FR | 2 887 712 A1 | 12/2006 |
| WO | 9939450 | 8/1999 |

OTHER PUBLICATIONS

International Search Report (PCT/ISA/210) dated Jun. 26, 2007.
Written Opinion (PCT/ISA/237) dated Jun. 26, 2007.
Lee Antenna circuit design for RFID application, 2003 Microchip Technology Inc. AN710.
Brazilian Office Action dated Dec. 13, 2017, in corresponding Brazilian Patent Application PI0622009-6.

* cited by examiner

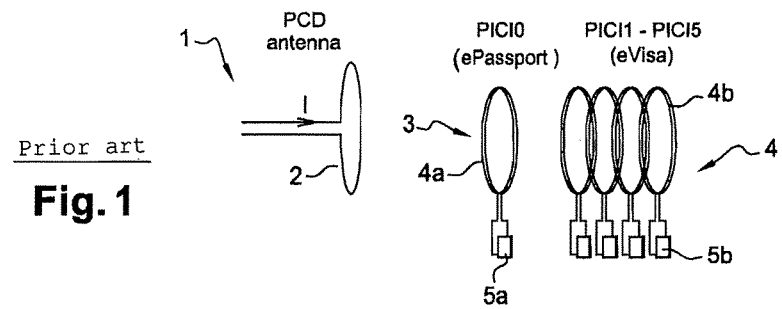
Prior art
Fig. 1
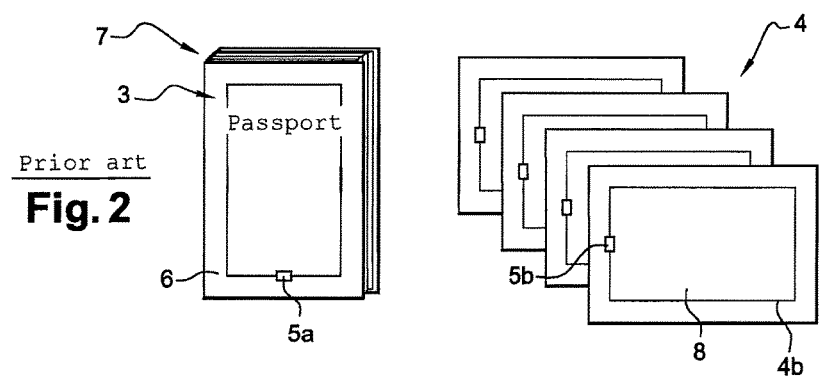
Prior art
Fig. 2
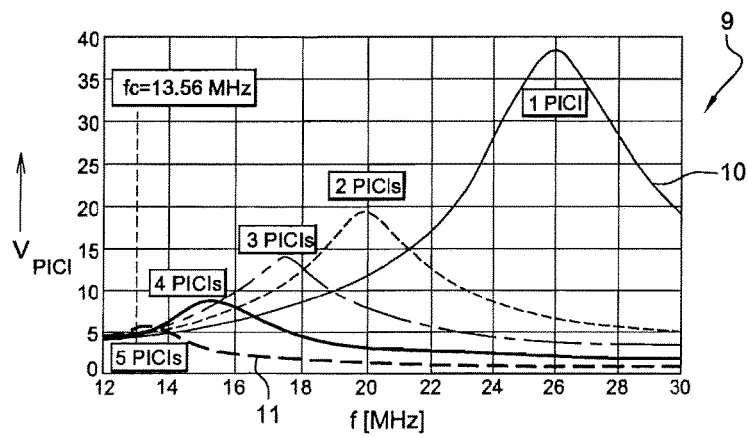
Prior art Fig. 3

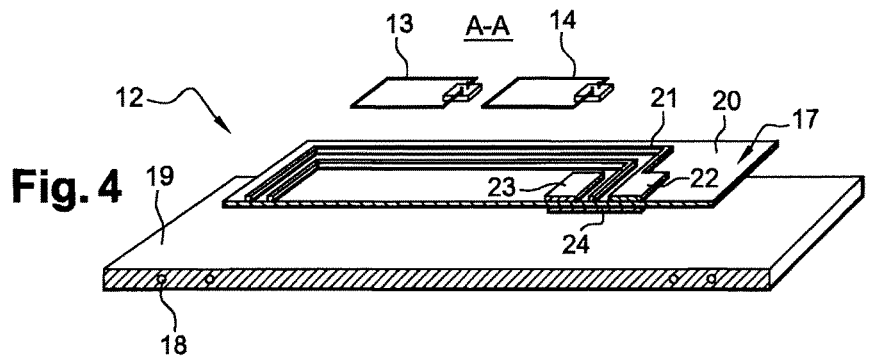
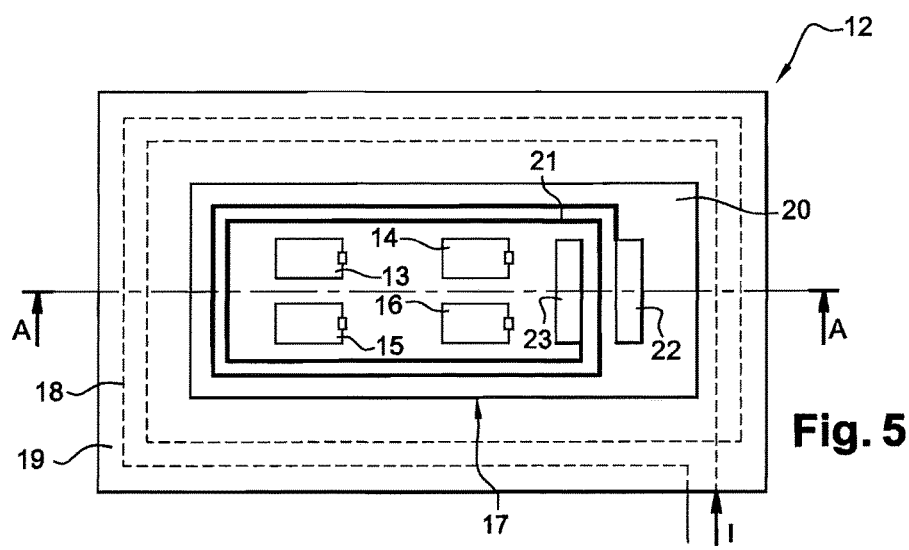
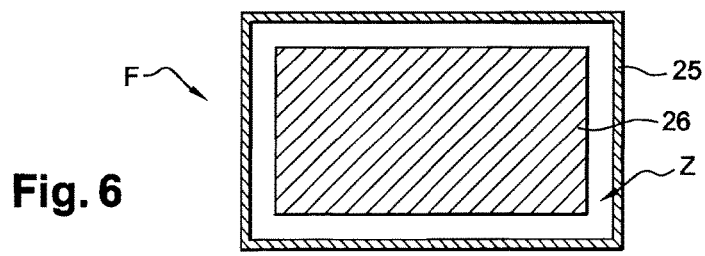

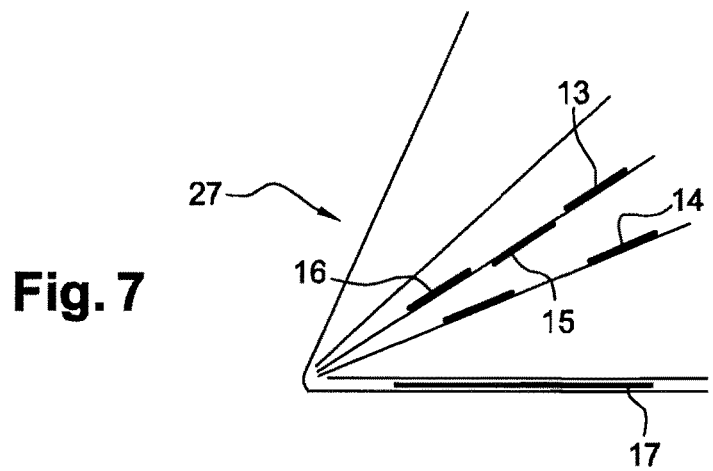
Fig. 7
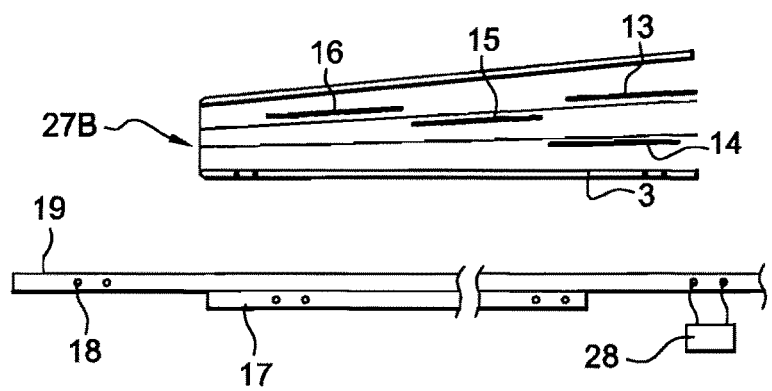
Fig. 8
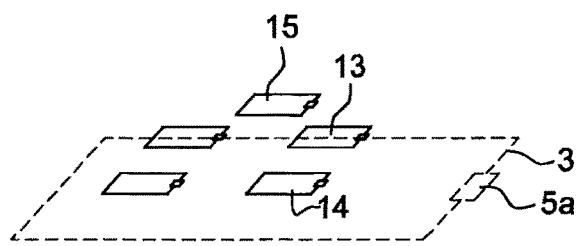
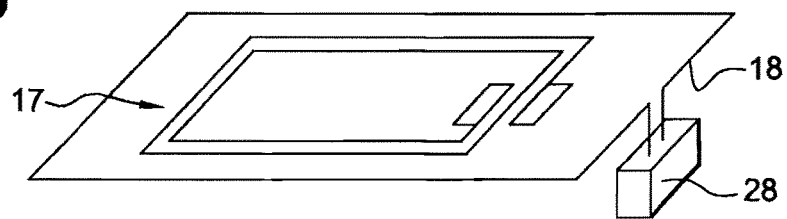
Fig. 9

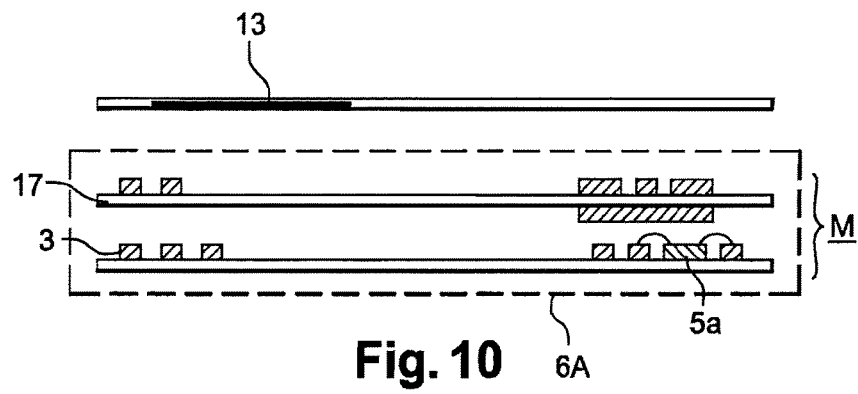
Fig. 10
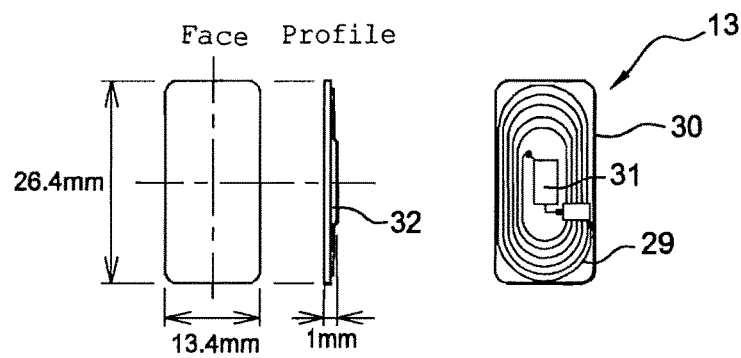
Fig. 11
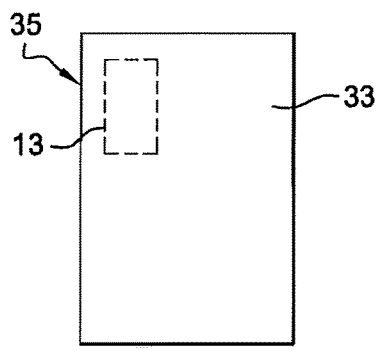 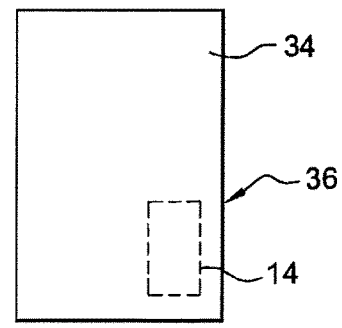
Fig. 12　　Fig. 13

METHOD AND SYSTEM FOR OPTIMIZED READING OF A RADIO FREQUENCY COMMUNICATION TRANSPONDER WITH THE AID OF A PASSIVE RESONANT CIRCUIT

The invention relates to the field of methods and systems for reading RF radio frequency transponders and the structure of such radio frequency transponders.

More particularly, the invention relates to an improvement in the reading and/or the communications between a transponder liable to be surrounded by several transponders and a reader provided for this purpose. The invention more particularly aims at an application of such methods and systems to the contactless reading of electronic travel documents such as electronic passports and electronic visas in the form of transponders positioned together. In particular, such documents and visas are compliant with ICAO "International Civil Aviation Organization" specification and the ISO7IEC 14443 standard.

The travel documents such as the electronic passports and/or the electronic visas are composed on the one hand of a paper document whereon information relative to the holder of said document is noted and on the other hand a contactless electronic chip which also contains secured information relative to the same holder.

The unsolved problem arises as soon as the travel document of the electronic passport type must also include several electronic visas.

As a matter of fact, because of the variable principles used by such contactless electronic chips, the increase in the number of electronic visas in the document makes the simultaneous reading more and more difficult when and as their number increases, which can even make the operation thereof impossible as soon as the number is greater than 4 or 5 visas.

The need expressed as regards electronic travel documents is that said document may contain a maximum of contactless electronic visas which are simultaneously operated when they are submitted to a magnetic field from a contactless reader. The reader and the travel documents must be compliant with the ISO/IEC 14443 standard.

The specifications of contactless electronic visa or visas request that on the one hand each visa consumes as little as possible magnetic field from the contactless reader and interacts therewith as little as possible and on the other hand that each one causes a variation of said magnetic field which is compatible with the specifications imposed by the ISO/IEC 14443 standard during the phases of responses from the visa to the reader.

The contactless technology resulting from the ISO/IEC 14443 standard describes the mechanisms making it possible to implement the anti-collision principles between contactless products. Such principles provide logical mechanisms which make it possible to retrieve a contactless product among several others when they are submitted to the same magnetic field. The condition required for a correct operation of such principle is that the reader supplies all the products existing in the field it generates and that it detects them all.

More particularly, the contactless anti-collision mechanism is limited by the consumption and the magnetic load induced by the sum of several contactless transponders. This limits the number of electronic visas which can be read in or out of an electronic passport.

In addition, the ISO/IEC 14443 standard contains a specification imposing that the contactless products be operated in a range of magnetic field between 1.5 A/m and 7.5 A/m. This specification makes it possible for contactless products to be operated from a magnetic field of at least 1.5 A/m.

A standard compliant reader can thus generate only a 1.5 A/m field in the presence of the travel document while being conformable with the standard. The ISO/IEC 14443 standard also imposes the minimum amplitude of the response of the contactless product so that the reader can detect it.

Such minimum amplitude is worth at least $30/H^{1,2}$ (or 18.6 mV), with H amplitude of the magnetic field. Such value is defined from the amplitude of the side bands generated because of the amplitude modulation of the reader magnetic field, with the frequency of 13.56 MHz by the contactless product at the rate of the sub-carrier thereof, rated at 847 Khz.

If these conditions are complied with, the contact reader complying with the standard should be capable of receiving the data from the contactless chip.

The present state of the art makes it possible to comply with all such conditions whenever a maximum number of a few electronic visas are positioned in the travel document. At present, 5 visas seem to be a maximum as regards the curve of the transponders response (FIG. 3 retrieved from the official document N1088 from ISO/IEC JTC1/SC17/WG8).

The inventor noted that if more than five contactless products which are individually standard compliant are used, when they are grouped in the same travel document, because of the electromagnetic coupling together, the assembly is no longer compliant with the ISO/IEC 14443 standard. The conformable contactless reader is no longer capable of supplying them or detecting them.

This limitation to five as regards the number of transponders is considered by the inventor as being potentially a disadvantage in the development of an electronic passport and also in a general way for the reading of several transponders positioned together whatever the considered application.

Thus the inventor has considered improving in a general way the contactless communication of a certain number of transponders for a constant power of the reader.

As regards the known prior art making it possible to improve the communication between the transponders and a reader, the patents FR 2 777 141 or U.S. Pat. No. 6,172,608 are known.

Such patents make it possible to have a second oscillating circuit which can be tuned on a frequency which is close to (or equal to) the electromagnetic field, so that the modulation of the field performed by the transponder is better detected by the antenna of the reader. Such documents more particularly teach the utilization of a passive resonant circuit for increasing the communication distance between the reader and the transponder while keeping a correct operation and without increasing the emission power of the reader.

On the other hand, the document FR 2 812 482-A1 is known, which uses a collective antenna which is closed to amplify the communication from the reader with several transponders positioned on the same support. The multiplicity of the transponders on a support corresponds to the problem of increasing the storage memory available on the support. The transponders have a more reduced format than the passive antenna because of the manufacturing cost. This document does not teach the optimization of the number of legible transponders for a constant electromagnetic field power.

In addition, the arrangement of a closed passive collective antenna associated with several transponders having more reduced dimensions than the passive antenna seems not to be operational, as exposed in the present document in the present state of the art of the person skilled in the art.

The invention more particularly relates to the solving of the above-mentioned drawbacks.

It more generally aims at improving the reading of transponders, such improvements being intended to lead to the increase in the number of transponders which can be read together in a determined electromagnetic field, whatever the dimension thereof.

It also aims at providing the optimization of the number of transponders which can be read together for the application to an electronic passport, in compliance with specifications of the ICAO and ISO/IEC14443, in particular. New transponders characteristics are supplied for this purpose.

According to a first aspect, the invention aims at a method for the contactless reading RF transponders positioned in one and the same magnetic interrogation field, wherein a magnetic coupling of the transponders is ensured with a passive resonant circuit during reading.

The method is characterised in that the passive antenna of the resonant circuit is associated with at least one transponder antenna, and the passive resonant is tuned in such a way that the resonant frequency resulting from the association corresponds to one of the frequencies of the emission side bands of the transponder to be read.

Such provisions make it possible to favor the amplitude of the transponder return signal.

According to a particular embodiment, the association of the passive antenna of the resonant circuit with at least one antenna of the transponder is made negligible and the passive resonant circuit is tuned to a resonant frequency corresponding to one of the frequencies of the emission side bands on the transponder to be read.

Such provisions make it possible to further simplify the reading method while favoring the amplitude of the return signal delivered by the chip of the antenna module or transponder.

The invention also relates to a system for reading at least one RF transponder, said system including a reader able to emit an interrogation field on at least one transponder and to collect a response from the transponder, a passive resonant circuit for performing a magnetic coupling with at least one transponder during the reading.

The system is characterised in that the passive resonant circuit is tuned in such a way that the resonant frequency resulting from the association of the resonant circuit with at least one transponder corresponds to one of the frequencies of the emission side bands of the transponder to be read.

Another aspect of the invention relates to a support object containing at least one main transponder, at least one secondary transponder and one passive resonant circuit associated with at least a main transponder.

The object can be distinguished in that the passive resonant circuit is tuned in such a way that the resonant frequency resulting from the association of the resonant circuit with the main transponder at least corresponds to one of the frequencies of the emission side bands of the secondary transponder.

Another aspect of the invention relates to a support object containing at least one transponder and a passive resonant circuit associated with at least the transponder. It can be differentiated in that the passive resonant circuit is tuned to a resonant frequency corresponding to one of the frequencies of the emission side bands of the transponder.

Another aspect of the invention relates to a transponder including a flat antenna on a support defining an outer turn;

the transponder is characterised in that:
the surface outside the outer turn is greater than a 15×15 mm surface and smaller than a surface of approximately 30×30 mm,
the antenna includes approximately between 13 and 18 turns,
the tuning frequency is between 15 and 18 MHz,
a quality factor is above 30.

Another aspect of the invention relates to a travel document including several pages between two covers and a plurality of transponders between the pages, with each transponder being contained in a plane support distinct from the pages or covers, but having substantially the same format of a page, with the transponder having the above characteristics.

According to an advantageous provision making it possible to have less interference or coupling between the transponders, the latter are positioned in the support in various positions and particularly in a random way.

Other characteristics and advantages of the invention will appear upon reading the following description given as a non limitative example and by referring to the appended drawings wherein:

FIG. 1 illustrates an electronic passport reading system according to the prior art;

FIG. 2 illustrates an electronic passport and the various visas of the prior art;

FIG. 3 illustrates response curves in response to the number of transponders of the prior art;

FIG. 4 illustrates a section in FIG. 5 along A-A;

FIG. 5 illustrates a transponder reading system complying with one embodiment of the invention;

FIG. 6 illustrates an area for the possible dimensions of the passive antenna according to one embodiment;

FIG. 7 illustrates a travel document which is compliant with an embodiment of the invention;

FIG. 8 illustrates a travel document reading system complying with the preceding Figure;

FIG. 9 illustrates a schematic view of the reading system of the preceding Figure;

FIG. 10 illustrates a reading configuration for transponders using an association of the passive resonant circuit with a main transponder;

FIG. 11 illustrates a transponder according to one embodiment of the invention;

FIGS. 12, 13 illustrate the transponder packaging according to another embodiment of the invention.

In FIG. 1, an existing system 1 for reading electronics passport and electronic visas in the form of transponders of the radio frequency (RF) type includes a reader able to emit an interrogation field via an emitting antenna 2 and to collect a response from the transponder submitted to this field.

The passport 3 (PICI0) and each visa 4 (PCI1-PICI5) include the same type of transponders, i.e. an electronic circuit ($5a$, $5b$) of the RF-ID (radio frequency identification) type connected to an antenna ($4a$-$4b$).

In FIG. 2, the passport transponder is buried in the cover 6 of a passport 7 and each electronic visa transponder is buried in a sheet 8.

In FIG. 3, a diagram of voltage response curve (10) of a transponder with a ID1 format (the format of present passports) has a peak beyond 35 volts whereas the voltage response of 5 transponders PICI positioned together is close to 5 volts. Beyond 5 transponders, the voltage dramatically drops and it is no longer possible to detect and to read more than 5 transponders having a frequency of 13.56 MHz.

Generally speaking, within the frame of the present description, transponder means any identification electronic circuit using detection or a communication using an electromagnetic field. More particularly, electromagnetic fields are concerned and they include a coil connected to a condenser and where an integrated circuit or any other electronic components can be found.

The transponders more particularly include an electronic component such as an integrated circuit chip connected to an antenna. They can be inserted into, or associated with any type of support. They may, for example, have the shape of adhesive electronic labels, contactless card; they can be buried in a packaging, the cover of a document, a sheet or any other thing, etc.

Transponders are used in various economics fields such as bank (electronic purse), communications, transport, identity (e-passport, ID card). More particularly as regards identity, identifying a person through a radio frequency communication with a contactless portable electronic object of the RFID type, is known.

In a general way, reader means within the scope of the following description, an emitter/receiver device provided with one antenna which creates an electromagnetic field at a given frequency. The antenna of the device also makes it possible to modulate the electromagnetic field and to measure variations in the electromagnetic field. The antenna of the device also makes it possible to modulate the electromagnetic field and to measure the variations in the electromagnetic field. The reader antenna is generally composed of one or several coils.

The reader-transponder system is operated in a more or less complex way according to the type of the transponder used. The general operation principle consists in emitting an electromagnetic field with a given frequency. When one transponder goes within the electromagnetic field, it is supplied and it reacts. The reaction of the transponder causes the variation of an electromagnetic field which is detected by the reader.

For the simplest systems, the transponder being for example composed of one coil and one condenser, the assembly is an oscillating circuit tuned on the frequency of the electromagnetic field. The presence of the transponder in the field makes the oscillating circuit resonate and causes a modification of the field which can be detected by the reader. Such systems which are very simple are currently used as anti-theft devices in department stores.

As regards the most complex systems, the transponder includes for example an integrated circuit connected to a coil, the coil and the integrated circuit forming among other things a tuned resonant circuit. The presence of the transponder in the electromagnetic field supplies the integrated circuit which modulates the electromagnetic field to have the reader detect the presence thereof. Then, a dialog can take place between the transponder and the reader through the modulation of the electromagnetic field.

In FIGS. 4 and 5, a reading system allows improvements in the reading of several transponders 13-16 by implementing during the reading, a magnetic coupling of the transponders with a passive resonant circuit 17.

The reading system 12 includes the emission-reception antenna 18 buried in a support 19 and the passive resonant circuit 17 is performed on a plane support 20 for example a paper sheet, and includes an open antenna 21 the ends of which are connected to plates 22, 23 of a capacitor. The antenna is in fact a double face device made by screen printing with a conductive ink; on the inner face the capacitor plate 24 is opposite two terminal plates 22, 23 connected to the turns.

The passive circuit is positioned in the above example of the reader antenna, for example placed or glued on a support plane close to the radio frequency antenna of the reader.

According to one implementation system, the passive antenna of the resonant circuit is associated, at least during the reading, with at least one transponder antenna. Association means a physical bringing together of their positions so as to obtain a magnetic coupling therebetween with or without a common support.

According to one step on the method, the passive resonant circuit is tuned to a resonant frequency so that the resonant frequency resulting from the association with at least one transponder antenna corresponds to one of the frequencies of the emission side bands of the transponder to be read.

The advantage consists in favoring the detection, by the reader, of the variations in the field caused by the transponders when they respond.

Preferably, the transponders are designed or configured so as to be neglected in the association with the passive resonant circuit, each more particularly by drawing less magnetic field and/or by interfering less with the other transponder antennas. The transponders, for this purpose, have a reduced format as compared to the antenna of the passive resonant circuit. In the example, the transponder is one or several of the transponders 13-16 with the small dimension to be read as compared to the antenna. The reduced format of the transponders is for example less than $1/10°$, even $1/5°$, the format of the passive resonant circuit antenna.

The advantage consists in allowing the supply of as many transponders as possible with the same field density.

Thus, in the example above, as this association is negligible in so far as there is no significant influence of small transponders on the resonant frequency resulting from the association, the resonant circuit is tuned to a frequency corresponding to one of the frequencies of the emission side band of the transponder to be read.

The emission side bands are generated by any other transponder submitted to an interrogation magnetic field that the transponder modulates more particularly in amplitude, during its response.

The side bands exist for other principles of modulations of the communication between a reader and a transponder, more particularly the phase modulation and frequency modulation.

In the example, an amplitude modulation of a sine-wave signal having a 13.56 MHZ frequency by a 847 Khz modulating signal corresponding to the sub-carrier generated by the transponder creates, from a spectral point of view, a signal with two side bands located at 13.56 MHz+/−847 KHz or 12.71 and 14.4 MHz respectively.

Other side bands as other than those hereabove are also generated but with less energy.

In order to favor as much as possible the detection by the reader and reach the minimum level of retro-modulated field defined by the ISO/IEC 14443 standard the resonance frequency of the passive resonant circuit is selected at 14.4 MHz, i.e. 13.56 MHz+847 KHz.

Other examples of association will be subsequently illustrated.

According to another implement, at least one format F of the transponder antenna and one transponder response having a behavior or characteristics corresponding to this format are determined and then the passive resonant circuit is configured in such a way as to obtain the behavior of the characteristics corresponding to such format for each transponder.

The passive antenna has thus been voluntarily defined in an area Z (FIG. 6) between two rectangles 25, 26 centered on each other and in the ID1 format described in the ISO/IEC 14443 standard, respectively 81 mm×49 mm and 64 mm×34 mm.

The advantage consists in obtaining a response from small transponders having the same characteristics as the big ones while allowing a reading of more transponders with a constant interrogation field.

This makes it possible to meet the specifications of the ICAO in order to allow the reading to a greater number of transponders, and a travel document 27 (FIG. 7) of the e-passport or e-Visa is manufactured and includes the passive antenna (or passive resonant circuit 17 composed of one or several conductive tracks) more particularly in the cover of the passport.

This travel document can shelter one or several transponder or transponders 13 to 16, each taking the part of the local field induced by the passive resonant circuit submitted to the field of the reader plus the part of the field which is radiated by the antenna of the reader about the surface of the antenna module or modules 13-16.

FIGS. 8 and 9 illustrate the system for reading the travel document. It includes, as above, a reading support 19 containing an emitting and receiving antenna 18 connected to means 28 for processing and operating the signal received.

The resonant circuit 17 is here fixed under the reading support. The advantage is to have a common circuit at the level of the reader for all the passports whereas in the example in FIG. 7, each document including such resonant circuit, it is not indispensable to have it at the reading level.

In the example, conformably with the provisions of ICAO, the amplitude of the magnetic field H of the reader is determined at a value above or equal to 1.5 A/m and the amplitude of the transponder response to a value above or equal to $30/H^{1,2}$.

The travel document includes a large dimensioned transponder 3 for example ID1 and several transponders 13-16 of smaller dimensions such as electronic visas.

The antenna modules 13-16 are not necessarily positioned on the same plane as those on which the passive antenna is positioned.

In FIG. 8, the passive resonant circuit 17 is positioned out of the travel document. It is associated with the reading system by being fixed under the reading support.

However, it could be positioned close to it, more particularly close to or stuck onto the reading support.

The passive resonant circuit can have the shape of a label stuck on the document more particularly with an adhesive. It can be integrated in the document more particularly in one of the pages or the covers thereof.

The transponders to be read (13-16, 3) are in the travel document 27B. In such a document, reduced dimensions, so-called secondary transponders, and large dimensions, so-called main transponders can be found. In this case, as indicated while referring to FIG. 10 described infra, it is recommended to tune the passive resonant circuit while considering the association with the main circuit.

The energy and coupling balance of such a solution cannot be compared with the balance obtained by ID1 dimension transponders which are compatible with ISO/IEC14443. Each antenna-module is separately perceived by the reader as having a format and thus an action on the magnetic field of the reader which corresponds to that of the passive antenna which is itself in compliance with the standard ID1 for the travel documents.

The geometric and electric characteristics, on the one hand, of the passive resonant circuit and the antenna-module preferably corresponding to the following description, on the other hand, exist.

As regards the reader and also the test devices such as those described in the test methods for contactless products: ISO/IEC 10373-6, the travel document including several electronic visas must be considered as only one contactless product.

The following preferable principles aiming at making a passive resonant circuit to be included in the travel document of the electronic passport type are the results thereof.

The passive resonant circuit must be such that the couple thereof with the reader causes an effect complying with the contactless card equipped with a ID1 format antenna.

It must cause a low load on the electromagnetic field generated by the reader. Such load must correspond to that caused by the reference PICC, appendix D of the ISO/IEC 10373-6 standard adjusted on 6 Volt for Hmin. The loading induced by the transponder corresponds to an ID1 antenna tuned on 13.56 Mhz and including a resistive part of 1.8 kΩ and the continuous voltage of which is the result of an interrogation field of less than 6V at the load terminals.

This results in the resonant circuit having the following geometric characteristics.

As described hereabove, the passive antenna has thus been voluntarily defined in a zone Z between two rectangles 25, 26 centered on each other and on the ID1 format described in the ISO/IEC 14443 standard, respectively 81 mm×49 mm and 64 mm×34 mm (FIG. 6).

In order not to limit too much the field generated by the contactless reader, the quality factor on the passive resonant circuit is voluntarily limited to a value of less than 30.

The optimum quality coefficient of such resonant circuit for meeting the conditions described hereabove is between 10 and 20. The optimum value of the quality factor of the passive resonant circuit is 20. This allows drawing technologies for an antenna with a strong electric resistance such as screen printing using silver ink or carbon ink. Because of the necessity for an overvoltage factor, the passive resonant circuit must be composed of an antenna composed of several terms and connected to a capacitor.

The passive resonant circuit must supply to the electromagnetically coupled antenna-modules, the additional energy which they require because of their small coupling surfaces with the reader. The passive resonant circuit must generate an additional local field as a complement to that delivered by the reader which supplies the antenna modules.

On the other hand (FIG. 11) the transponder 13 can be made in the form of an antenna module complying with the chip card technology. It includes a flat antenna 29 on an isolating support 30 (dielectric film) in a plane and is connected to an integrated circuit chip 31. The chip may include a protective coating resin 32 or not. The assembly may have a global thickness of less than 1 mm.

The antenna 29 is preferably made of a metal wire or copper etching so as to have a good quality factor.

The transponder will advantageously have a reasonable size for example 25 mm in length, 15 mm in width and include an antenna of about fifteen turns for example between 13 and 18 turns. The number of turns will slightly depend on the selected chip.

Each turn for example made of copper has for example a width of the order of 50 to 300 μm with a spacing between two contiguous turns of the order of 50 to 200 μm.

A compromise or optimization between the surface ratio is still to be reached. A module-antenna having too small a surface for example of less than 10 mm by 10 mm would require a very accurate positioning with respect to the passive resonance circuit in order to allow a correct operation which a priori excludes the devices based on antennas directly made on the surface of the chip.

A contrario, a module-antenna having dimensions above 30 mm by 30 mm would consume too much magnetic field and would be too coupled to the other modules having an antenna to allow the operation of several integrated circuit chips or electronic visas.

The ideal solution is a resonance frequency of transponders amounting to 17 MHz.

Considering the geometry of the transponders, the resonance frequency and the number of the turns, the number of the passive resonance circuit turns is optimum for 4 turns. The surface of the capacitor plates is so calculated as to make the frequency tuning, as mentioned hereabove.

In FIG. 10, the passive resonant circuit 17 is associated with a transponder having an antenna, the dimensions of which can be compared to those of the passive circuit. The importance thereof is such that it must be considered within the tuning in frequency of the passive resonant circuit.

As a matter of fact, the resultant resonance frequency of two circuits is defined by the following relation:

where k: the coupling coefficient between the transponders (equal to 1 if the coupling is the maximum one)

fres.2: resonance frequency resulting from the association of two transponders having the same resonance frequency "fres".

This could be for example the ID1 format transponder such as presently positioned in the cover of the electronic passport of the prior art or one of the electronic visas in the ID1 format as in FIG. 2.

The passive resonant circuit is so tuned that the resonance frequency resulting from the association M corresponds to one of the frequencies of the emission side bands of the transponder to be read.

The two associated elements can be grouped together in the same support, for example a cover 6A of the travel document.

Due to the extension of this principle, the association may concern several transponders so long as the number thereof gives them a non-negligible importance.

According to an advantageous provision illustrated in FIGS. 12 and 13, each electronic visa is positioned in a support 33, 34, for example a sheet which is substantially of the same format as the document or slightly smaller. In the application to the passport, the support is in the ID1 format or slightly smaller. The important thing is not leaving the choice to the user when it is applied into the document.

This transponder support 33 must be placed in the document or stuck onto a page more particularly using a self-adhesive coating.

The transponder 13 is positioned in a random position inside the support upon the manufacturing of the visa more particularly through lamination. In FIG. 12, it is positioned along the left side edge 35 whereas it is positioned along the right side edge 36 in FIG. 13. Thus, when both sheets are superimposed, the transponders get less coupled together.

An embodiment of the transponders must include, for this purpose, a step and means for the random or varied position of the transponder on the surface of a transporter support sheet for example during the lamination of sheet sandwiching the transponder.

Thus, when it is copied in the travel document, it is distributed also in a random way with respect to the other transponders. The result is that the labels are all different as regards the magnetic point of view and they can be more easily operated even though they are superimposed.

Thus, thanks to the invention, it is possible to make the application of an electronic Visa with a more important number of electronic visas possible. The preferred characteristics, as mentioned hereabove, make it possible to read up to 15 transponders complying with the ICAO specifications.

The reading method can implement an anti-collision mechanism or protocol of a known type more particularly the one described in the standard. The mechanism can be triggered by the reader processing means.

According to another aspect, the invention makes it possible to produce an electronic travel document. This document is supposed to include a plurality of transponders complying with constraints or specifications more particularly resulting from the standard (ICAO) which impose at least one ID1 format of transponder antenna, a minimum amplitude of the magnetic field H for the reading and a minimum amplitude for the response from the transponders.

According to this other aspect, the transponder is made with an antenna format smaller than the ID1 format and said transponder is so arranged with a passive resonant circuit and a capacitor and a passive antenna with an ID1 format, so that the transponder is seen by the reader as a ID1 format transponder.

The travel document according to the invention may include several pages and a plurality of transponders between the pages, with each transponder being contained in a plane support separate from the pages but substantially having the format of a page of the document.

This document can easily be read by all the transponders in so far as the transponders are positioned in the supports in various positions.

Consequently, the invention is also characterised by an assembly or a set of transponders, more particularly for electronic visas, in that each transponder is positioned in a sheet (33, 34) having a bigger format than the format and in that the transponders are positioned in the sheets (33, 34) in various positions from one sheet to another.

Although the invention has mainly been described in relation with a travel document, it can be applied to any object supporting a passive resonant circuit associated to at least one transponder such as for example an electronic label, a chip card including a module-antenna associated with a passive resonant circuit the antenna of which has the dimensions of the contactless chip ID1.

Such objects are preferably portable devices such as a chip card or a cell phone.

The passive antenna can be included in the body of the chip card, more particularly about the module antenna inserted in a standard cavity of the chip card. The passive antenna together with the resonant circuit can also be integrated in the reader.

The invention claimed is:
1. A method for reading RF transponders disposed in one and the same magnetic interrogation field, comprising:
magnetically coupling transponder antennas connected to a transponder circuit of each respective transponder with a reader antenna of a reader by means of a passive resonant circuit connected to a passive antenna that is separate from the transponder antenna; and associating the passive antenna of the passive resonant circuit with at least one transponder antenna, wherein the passive resonant circuit is tuned in such a way that the resonance frequency resulting from the association corresponds to one of the frequencies of the emission side bands of the transponder to be read, and each transponder circuit is distinct from the passive resonant circuit such that each transponder circuit and the passive resonant circuit are distinct components where each transponder antenna is not electrically connected to the passive resonant circuit and the passive antenna is not electrically connected to a transponder circuit.

2. A method according to claim 1, wherein the association of the passive antenna of the passive resonant circuit with at least one transponder antenna is made negligible and the passive resonant circuit is tuned to a resonance frequency corresponding to one of the frequencies of the emission side bands of the transponder to be read.

3. A reading method according to claim 2, wherein the method further includes a step during which:

the transponders are so configured as to be negligible in the association with the passive resonant circuit, by each drawing less magnetic field and/or by interfering less with the other transponder antennas of the transponder.

4. A reading method according to claim 3, wherein at least one antenna format and one response from a transponder having a behavior corresponding to such format are determined, and the passive resonant circuit is so configured as to obtain a behavior corresponding to such a format for each transponder.

5. A reading method according to claim 4, wherein the passive antenna is defined between two rectangles respectively 81 mm×49 mm, and 64 mm×34 mm.

6. A reading method according to claim 5, wherein the passive antenna of the passive resonant circuit includes between 3 and 6 turns.

7. A reading method according to claim 1, wherein the side bands are respectively selected at 13.56 MHz±847 Khz or respectively 12.71 and 14.4 MHz, the interrogation frequency being 13.56 MHz rated at 847 Khz.

8. A reading method according to claim 1, wherein the passive resonant circuit has a quality factor with a value of less than 30.

9. A reading method according to claim 1, wherein the transponder has a reduced format and has the transponder antenna, and where the surface inside the outer turn of the transponder is greater than a 15×15 mm surface and smaller than a surface of 30×30 mm.

10. A reading method according to claim 9, wherein the transponder antenna includes 13 to 18 turns.

11. A reading method according to claim 10, wherein the tuning frequency is between 15 and 18 MHz.

12. A reading method according to claim 11, wherein the transponder has a quality factor above 30.

13. A reading method according to claim 12, wherein each transponder is positioned in a support in a random position, with the support allowing several positions of the transponder which are shifted with respect to each other.

14. A reading system with at least one RF transponder, with said system including one reader, having a reader antenna, able to emit an interrogation field on at least one transponder having a transponder antenna connected to a transponder circuit therewith and to collect a response from the transponder, a passive resonant circuit distinct from the transponder circuit of each at least one transponder, having a passive antenna connected therewith that is separate from the transponder antenna, to perform a magnetic coupling with at least one transponder during the reading, wherein the passive resonant circuit is tuned in such a way that the resonant frequency resulting from the association of the resonant circuit with at least one transponder corresponds to one of the frequencies of the emission side bands of the transponder to be read, and each transponder antenna is not electrically connected to the passive resonant circuit and the passive antenna is not electrically connected to a transponder circuit.

15. A supporting object containing at least one main transponder, one secondary transponder and an associated and distinct passive resonant circuit associated with at least the main transponder, wherein a passive antenna of connected to the passive resonant circuit is associated with, and separate from, a transponder antenna of connected to a transponder circuit of at least the main transponder, and wherein the passive resonant circuit is tuned in such a way that the resonant frequency resulting from the association of the resonant circuit with at least the main transponder corresponds with one of the frequencies of the emission side bands of the secondary transponder, and each transponder antenna is not electrically connected to the passive resonant circuit and the passive antenna is not electrically connected to a transponder circuit.

16. A supporting object containing at least one transponder having a transponder antenna connected to a transponder circuit therewith and one passive resonant circuit distinct from the transponder circuit of each at least one transponder having a passive antenna connected therewith that is separate from each transponder antenna and associated with at least one transponder antenna, wherein the passive resonant circuit is tuned to a resonance frequency corresponding to one of the frequencies of the emission side bands of the transponder, and each transponder antenna is not electrically connected to the passive resonant circuit and the passive antenna is not electrically connected to a transponder circuit.

* * * * *